United States Patent
Benesh

[11] Patent Number: 6,132,793
[45] Date of Patent: Oct. 17, 2000

[54] METHOD OF MANUFACTURING A BUTTERLIKE COMPOSITION

[75] Inventor: Yoel Benesh, Tzur Yigal, Israel

[73] Assignee: Olivia Gourmet Ltd., Israel

[21] Appl. No.: 09/096,475

[22] Filed: Jun. 12, 1998

[51] Int. Cl.⁷ ..................................................... A23D 7/04
[52] U.S. Cl. .......................... 426/604; 426/603; 426/573
[58] Field of Search ................................... 426/663, 664, 426/603, 604, 573

[56] References Cited

U.S. PATENT DOCUMENTS

| 4,238,520 | 12/1980 | Miller et al. | 426/573 |
|---|---|---|---|
| 4,273,795 | 6/1981 | Bosco et al. | 426/602 |
| 4,279,941 | 7/1981 | Bosco et al. | 426/602 |
| 4,292,333 | 9/1981 | Bosco et al. | 426/335 |
| 4,362,758 | 12/1982 | McNeill et al. | 426/603 |
| 4,533,561 | 8/1985 | Ward | 426/603 |
| 4,536,411 | 8/1985 | Kirton et al. | 426/603 |
| 4,632,841 | 12/1986 | Parke et al. | 426/604 |
| 4,978,554 | 12/1990 | Larsson et al. | 426/604 |
| 4,990,355 | 2/1991 | Gupta et al. | 426/602 |
| 5,082,684 | 1/1992 | Fung . | |
| 5,169,671 | 12/1992 | Harada et al. | 426/658 |
| 5,294,455 | 3/1994 | O'Brien et al. | 426/573 |
| 5,338,562 | 8/1994 | Humphreys . | |
| 5,338,563 | 8/1994 | Mikulka et al. | 426/604 |
| 5,340,600 | 8/1994 | Reckweg et al. | 426/603 |
| 5,346,716 | 9/1994 | Bakal et al. | 426/603 |
| 5,409,727 | 4/1995 | Tholl | 426/603 |
| 5,501,869 | 3/1996 | Bubga | 426/658 |
| 5,508,056 | 4/1996 | Norton et al. | 426/602 |
| 5,532,020 | 7/1996 | Silver | 426/604 |
| 5,536,523 | 7/1996 | Blauel et al. . | |
| 5,614,245 | 3/1997 | Gupta et al. | 426/602 |
| 5,656,323 | 8/1997 | Underdown | 426/603 |
| 5,659,000 | 8/1997 | Cain et al. | 426/602 |
| 5,660,872 | 8/1997 | Van Loo | 426/658 |
| 5,837,307 | 11/1998 | Bodor | 426/603 |
| 5,851,576 | 12/1998 | Abboud | 426/550 |

FOREIGN PATENT DOCUMENTS

| 0388572 | 9/1990 | European Pat. Off. . |
|---|---|---|
| 0 576 474 B1 | 3/1992 | European Pat. Off. . |
| 0 547 658 A1 | 12/1992 | European Pat. Off. . |
| 0605217 | 12/1993 | European Pat. Off. . |
| WO 94/22327 | 10/1994 | WIPO . |
| WO 96/03888 | 2/1996 | WIPO . |
| WO 97/31544 | 9/1997 | WIPO . |

Primary Examiner—Carolyn Paden
Attorney, Agent, or Firm—Pennie & Edmonds LLP

[57] ABSTRACT

A butterlike composition which includes a solidified emulsion of at least one vegetable oil, water and at least one hydrocolloid the composition having butterlike properties.

20 Claims, No Drawings

METHOD OF MANUFACTURING A BUTTERLIKE COMPOSITION

FIELD AND BACKGROUND OF THE INVENTION

The present invention relates to a butterlike composition and method of manufacturing same, and more particularly, to a butterlike composition of natural, unmodified vegetable oils and nutritional fibers. Specifically, the present invention concerns a novel technology for vegetable oil solidification, which preserves the oil's quality, its original molecular structure and composition, its biological characteristics and its nutritional value, by solidifying the oil with nutritional fibers.

Butterlike substances are soft whitish or yellowish fatty solids processed for cooking, frying and for table use as spreads. Examples include butter which is a soft whitish or yellowish fatty solid that separates from milk or cream when it is churned, and margarine which is made of refined vegetable oils which undergo chemical solidification (i.e., hydrogenation, saturation) and/or blended sometimes with animal fats and emulsified usually with water or milk.

The solid characteristic of all of the prior art butterlike substances results from the high percentage of saturated fatty acids contained therein. According to the prior art, solidification is achieved either by purification, as is the case for butter, or by hydrogenation or mixing with saturated fatty acids, as is the case for types of margarine. In both cases, however, the make-up of the oils employed, i.e., the chemical structure and/or composition are modified.

A large body of information indicates that daily consumption of saturated fatty acids has a bad influence of human health, especially due to the rise in blood cholesterol levels inflicted thereby and the possible development of cardiovascular diseases, arteriosclerosis and gallstones. In addition, butter itself includes high percentage of cholesterol which by itself increases the chances of developing such diseases.

Margarine, on the other hand, which also includes relatively high levels of saturated fat, is in most cases the product of catalyzed hydrogenation, which introduces trans fatty acids therein, which were shown to cause membrane alterations which may lead to development of cancer. Furthermore, during hydrogenation the chemical make-up of the vegetable oil employed for the production of margarine changes, and as a result, beneficiary influences of such make-up on human health is lost.

Vegetable oils, especially olive oil, are low in saturated fatty acids. Indeed, many studies have shown that olive oil consumption as a major source of fatty acids reduces blood cholesterol levels in patients suffering from high blood cholesterol (e.g., cholesteremia). It was further shown that olive oil consumption lowers the light density lipoprotein/high density lipoprotein (LDL/HDL) ratio in the blood, i.e., it decreases the blood level of "bad" cholesterol and thereby lowers the risk of developing cardiovascular diseases. It is therefore not surprising that some physicians refer to olive oil as a medicament. Other vegetable oils are also known to have beneficiary effects on human health.

Consumption of nutritional fibers is known to reduce blood cholesterol, to assist in digestion and to lower the chances of developing intestine and colon cancers.

There is thus a widely recognized need for, and it would be highly advantageous to have, a butterlike composition devoid of the bad influences associated with butter and/or margarine consumption and which enjoys the benefits of consuming unmodified vegetable oil and nutritional fibers.

SUMMARY OF THE INVENTION

According to the present invention there is provided butterlike composition comprising a solidified emulsion of at least one vegetable oil, water and at least one hydrocolloid, the composition having butterlike properties.

According to further features in preferred embodiments of the invention described below, the vegetable oil maintains its chemical make-up while in the composition.

According to still further features in the described preferred embodiments the at least one vegetable oil maintains its chemical make-up while in the composition.

According to still further features in the described preferred embodiments the butterlike composition further comprising at least one substance selected from the group consisting of emulsifier, stabilizer, flavor, preservative, colorant, acid and salt.

According to still further features in the described preferred embodiments the vegetable oil is selected from the group consisting of olive oil, cocoa oil, sunflower seed oil, soybean oil, corn oil, sesame oil, peanut oil, coconut oil and palm oil.

According to still further features in the described preferred embodiments the at least one vegetable oil is a liquid oil at ambient temperature.

According to still further features in the described preferred embodiments the hydrocolloid and stabilizer are each independently selected from the group consisting of natural seaweed extract, natural seed gum, natural plant exudate, natural fruit extract, animal skin and bone extract, bio-synthetic gum, starch, cellulase and inulin.

According to still further features in the described preferred embodiments (a) the natural seaweed extract is independently selected from the group consisting of carrageenan, alginates, agar, agarose, fucellan and xantham gum; (b) the natural seed gum is independently selected from the group consisting of guar gum, locust bean gum, tara gum, tamarind gum and psillium gum; (c) the natural plant exudate is independently selected from the group consisting of gum arabic, tragacanth, karaya and ghatti; (d) the natural fruit extract is independently selected from the group consisting of low and high methoxyl pectins; (e) the animal skin and bone extract is independently selected from the group consisting of gelatin A and B and hydrolyzed gelatin; (f) the bio-synthetic gum is independently selected from the group consisting of xantham, gellan, curdian and pullulan; (g) the starch is independently selected from the group consisting of natural starch and chemically, physically and enzymatically modified starch; (h) the cellulose is independently selected from the group consisting of alpha cellulose, CMC, HPC, HPMC, MC, microcrystalline cellulose whereas (i) inulin is selected from the group consisting of instant gelating inulinand long chain inulin.

According to still further features in the described preferred embodiments the hydrocolloid includes a nutritional fiber.

According to still further features in the described preferred embodiments the nutritional fiber is inulin.

According to still further features in the described preferred embodiments the inulin is selected from the group consisting of instant gelating inulin and long chain inulin.

According to still further features in the described preferred embodiments the flavor is independently selected from the group consisting of butter flavor, butter vanilla flavor and olive flavor, the preservative is independently selected from the group consisting of potassium sorbat, sodium benzoate, lactic acid and citric acid, the colorant is independently selected from the group consisting of carotenoid, riboflavin, corcumin, beet powder, red color MN and spinach oleoresin, the acid is independently selected from the group consisting of citric acid, glucono delta lactone, whereas the salt is independently selected from the group consisting of sodium chloride and potassium chloride.

According to still further features in the described preferred embodiments the emulsifier is lecithin.

According to still further features in the described preferred embodiments the butterlike composition comprising about 5–30 weight percent fat, less than 5 weight percent saturated fat and ingredients providing 50–250 Calories per 100 grams.

According to still further features in the described preferred embodiments the butterlike composition comprising about 15–25 weight percent oil and 30–40 weight percent hydrocolloid.

Further according to the present invention there is provided a method of preparing a butterlike composition as described above, the method comprising the steps of (a) mixing at least one vegetable oil with at least one emulsifier for obtaining an oil-emulsifier mixture; (b) while mixing the oil-emulsifier mixture, adding water to the oil-emulsifier mixture at a rate permitting formation of emulsion; (c) while mixing the emulsion, adding an emulsion stabilizer to the emulsion for obtaining a stabilized emulsion; (d) while mixing the stabilized emulsion, adding to the stabilized emulsion a hydrocolloid for obtaining a hydrocolloid containing emulsion; and (e) pouring the hydrocolloid containing emulsion into molds and allowing the hydrocolloid containing emulsion to solidify, thereby obtaining the butterlike composition.

According to still further features in the described preferred embodiments steps (a) through (e) are executed at ambient temperature.

According to still further features in the described preferred embodiments the vegetable oil maintains its chemical make-up throughout steps (a) to (e).

It is an object of the present invention to provide a butterlike composition which is advantageous for human consumption when compared with prior art butterlike products, such as butter and margarine.

It is another object of the present invention to use unmodified olive oil in a butterlike composition because olive oil consumption has many advantages over the consumption of other oils or fats, including in decreasing blood cholesterol levels, reducing the LDL/HDL ratio and thereby reducing the likelihood of developing cardiovascular diseases associated with high blood cholesterol levels and LDL/HDL ratios.

It is yet another object of the present invention to provides a butterlike composition which is very low in fat and in Calories content as is compared with accepted butterlike products.

It is still another object of the present invention to provide a butterlike composition which is, as compared with known solid fat based foods, exceptionally low in saturated fat, yet it still maintains its butterlike properties.

It is however another object of the present invention to provides a butterlike composition with very high content of nutritional fibers, which are known to have beneficiary effects on human health, including in reducing blood cholesterol levels, assisting in digestive processes, and reducing the chances of developing intestine and colon cancers.

It is yet another object of the present invention to provide an animal fat free butterlike composition devoid of harmful fat trans acids, which are present in hydrogenated butterlike compositions such as margarine.

The present invention successfully addresses the shortcomings of the presently known configurations by providing a butterlike composition which is low in fat, calories and saturated fat, as compared with prior art products, and which includes unmodified fat derived from vegetable oils and nutritional fibers, both are well known to be beneficiary to human health.

DESCRIPTION OF THE PREFERRED EMBODIMENTS

The present invention is of a butterlike composition comprising unmodified vegetable oils and hydrocolloids which can be used for replacing saturated fatty acid rich butterlike products such as butter and margarine in human diet. Specifically, the present invention can be used to provide a novel unmodified vegetable oil based butterlike product, which preserves the oil's quality, its original molecular structure, its biological characteristics and its nutritional value, which product is also enriched with nutritional fibers.

The principles and operation of a butterlike composition according to the present invention may be better understood with reference to the accompanying descriptions and examples.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Thus, according to the present invention there is provided a butterlike composition which includes a solidified emulsion of at least one vegetable oil, water and at least one hydrocolloid. The composition according to the present invention has butterlike properties, e.g., texture, color, appearance, stability and spreadability.

As used herein in the specification and in the claims section below, the term "butterlike" refers to a composition featuring properties similar to those of butter, margarine and the like.

As used herein in the specification and in the claims section below, the term "vegetable oil" refers to oil extracted from any part of any vegetation (plant), in particular plant seeds.

Thus, any vegetable oil may be used as the source of oil for the butterlike composition of the present invention. Presently preferred vegetable oils include, but are not limited to, olive oil, cocoa oil, sunflower seed oil, soybean oil, corn oil, sesame oil, peanut oil, coconut oil and palm oil.

Most vegetable oils are liquids at ambient temperature. Of the above list of oils these include the olive oil, cocoa oil, sunflower seed oil, soybean oil, corn oil, sesame oil and the peanut oil.

However, other vegetable oils, such as coconut oil and palm oil, due to higher saturation of their fatty acids, are semisolids at room temperature. In these cases the oil/hydrocolloid ratio in the respective butterlike composition is appropriately reduced, such that the resulting composition features butterlike properties.

A unique feature of the butterlike composition of the present invention is that the vegetable oil therein maintains its chemical make-up while in the composition. In other words, the vegetable oil is not diluted with more saturated oils, nor it is undergoing hydrogenation to render it more saturated. As further detailed hereinunder, solidification of the oil(s) employed into a butterlike composition is effected according to the present invention by the hydrocolloid.

Without in any way limiting the scope of the present invention, at present, olive oil, either extra virgin (cold press) or refined (solvent extraction), is the preferred source of oil for the butterlike composition of the present invention due to its inherent benefits to human health.

According to a preferred embodiment of the present invention the butterlike composition further includes one or more of the following substances: emulsifier, stabilizer, flavor, preservative, colorant, acid, salt, spices and/or other food additives.

Lecithin, which is originated from soybean seeds, is typically used as an emulsifier for mixing together otherwise non-mixable substances such as oil and water. Lecithin is presently the preferred emulsifier for emulsifying the butterlike composition according to the present invention. Depending on the application, emulsifiers, and to this effect lecithin, are typically employed at low weight percent concentrations, e.g., few, one or less then one weight percents, in their respective composition.

Hydrocolloids are gelating agents which are employed as emulsifiers, stabilizers and thickeners of foods. When used as emulsifiers and/or stabilizers hydrocolloids are employed at low weight percent concentrations, e.g., fraction of weight percents to few weight percents, depending on the application and hydrocolloid of choice. On the other hand, when hydrocolloids are used as thickeners (solidifiers) they are employed at higher weight percent concentrations, e.g., typically above 10 weight percent and more. Different hydrocolloids have different properties and therefore skills are required for selecting the appropriate hydrocolloid(s) and their respective concentration(s) for given applications.

Hydrocolloids derived from nine different sources are known. These include (a) natural seaweed extracts, such as, but not limited to, carrageenan, alginates, agar, agarose, fucellan and xantham gum; (b) natural seed gums, such as, but not limited to, guar gum, locust bean gum, tara gum, tamarind gum and psillium gum; (c) natural plant exudates, such as, but not limited to, gum arabic, tragacanth, karaya and ghatti; (d) natural fruit extracts, such as, but not limited to, low and high methoxyl pectins; (e) animal skin and bone extracts, such as, but not limited to, gelatin A and B and hydrolyzed gelatin; (f) bio-synthetic gums, such as, but not limited to, xantham, gellan, curdian and pullulan; (g) starches, such as, but not limited to, natural starch and chemically, physically and enzymatically modified starch; (h) celluloses, such as, but not limited to, alpha cellulose, CMC, HPC, HPMC, MC, microcrystalline cellulose; and (i) inulin is selected from the group consisting of instant gelating inulin and long chain inulin. The latter agents belong to the group of nutritional fibers.

As used herein in the specification and claims section below, the term "nutritional fiber" and its equivalent term "dietary fiber" both refer to fibrous carbonaceous substances which resist hydrolysis by human alimentary enzymes but are hydrolyzed and fermented by the gastro-intestinal microflora.

As nutritional fibers consumption is known to have beneficial effect on human health, such as reducing blood cholesterol, assisting in digestion, and preventing cancer of the intestine and colon. Nutritional (or dietary) fiber hydrocolloids are presently the hydrocolloids of choice for solidifying the butterlike composition of the present invention.

Inulin, which is a nutritional fiber, is a natural polymer of fructose found in numerous plants, such as, but not limited to, garlic, salsify, onion and chicory. It includes a chain of fructose units with ($\beta$2-1 bonds), which ends with a glucose unit. Chicory inulin, is commercially available from COSURCA S. A., Belgium, under the name FIBRULINE or FUBRULINE. FIBRULINE includes long chain inulin and it is therefore gelating only post heating, whereas FUBRULINE includes short chain inulin (instant inulin) and it is therefore readily gelating at ambient temperature.

Without limiting the scope of the present invention, inulin is presently the nutritional fiber of choice for solidifying the butterlike composition according to the present invention.

In preferred embodiments inulin is employed in 10–60, preferably 15–50, more preferably 20–45, most preferably 20–40 weight percent, depending on the level of saturation of the vegetable oil(s) of choice and the hardness desired.

Gum arabic is a natural food additive obtained from certain varieties of acacia. It is tasteless, odorless and it is frequently used in commercial food processing to thicken, emulsify and/or stabilize foods such as candy, ice cream and sweet syrup.

Guar gum is a gummy substance obtained from plants of the legume genera. Guar gum is typically used as a thickener and stabilizer in commercial food processing.

Xanthan gum is produced by fermentation of corn sugar. It is typically used as a thickener, emulsifier and stabilizer of foods such as salad dressings. Gum arabic, guar gum, xanthan gum and/or pectin are preferably used in combination in the preferred butterlike composition according to the present invention as emulsion stabilizers. They are therefore used at low concentrations, e.g., below one weight percent (see Table 1 below).

According to a preferred embodiment of the present invention the flavor is selected from the following: butter flavor in either dry or liquid form (e.g., available from C. Melchers and Co.), butter vanilla flavor (e.g., available from C. Melchers and Co.) and/or olive flavor (e.g., available from Frotarum Ltd., Israel and Baltimore Spices, U.S).

According to another preferred embodiment of the present invention the preservative is selected from the following: potassium sorbat, sodium benzoate, lactic acid and citric acid. The preservative is preferably a natural anti-oxidant.

According to still another preferred embodiment of the present invention the colorant is selected from the following: carotenoid, such as, but not limited to, beta carotene.

According to yet another preferred embodiment of the present invention the acid is selected from the following: citric acid and glucono delta lactone (GDL). The acid is employed to keep the pH of the butterlike composition according to the present invention below pH 6, preferably below pH 5, more preferably below pH 4, most preferably between pH 2.5 and pH 4.

According to still another preferred embodiment of the present invention the salt is selected from the following: sodium chloride and potassium chloride. The salt is used to provide salty butterlike compositions.

The presently most preferred butterlike compositions in accordance with the teachings of the present invention are described under Example 1 below (see Table 1). Example 1 further provides a comparison between the preferred butterlike compositions of the present invention and prior art butterlike products (see Tables 2 and 3).

One of the features and advantages of the butterlike composition according to the present invention is its low fat content. Compositions including as low as about 20 weight percent, preferably abut 15–25 weight percent, more preferably about 5–30 weight percent fat are readily prepared following the method steps described hereinunder. As such, a composition according to the present invention differs and is advantageous over prior art butterlike products which contain about 40–80 weight percent fat (see Tables 1–3 below).

Similarly, compositions including less than about 5 weight percent, preferably less than about 4 weight percent, more preferably, less than about 3 weight percent, most preferably, about 2 weight percent or less saturated fat can be readily prepared by appropriate oil selection and fat content selection, because, as already stated hereinabove, unmodified vegetable oil is the sole source for oil in the butterlike composition according to the present invention (see Table 2 below).

Because of the low fat content and the high content of dietary fibers, compositions providing 50–250 Calories (kilocalories) per 100 grams are readily manufacturable, as compared with about 350–700 Calories and more per 100 grams of prior art butterlike products (see Tables 2–3 below).

A method of preparing a butterlike composition according to the present invention preferably includes the following method steps, in which, in a first step at least one vegetable oil is mixed with at least one emulsifier for obtaining an oil-emulsifier mixture.

Thereafter, water is added to the oil-emulsifier mixture at a rate permitting formation of emulsion.

Then, an emulsion stabilizer is added to the emulsion thus formed for obtaining a stabilized emulsion.

Afterwards, a hydrocolloid is added to the stabilized emulsion for obtaining a hydrocolloid containing emulsion.

Finally, the hydrocolloid containing emulsion is poured into molds in a process known in the art as "filling", and the hydrocolloid containing emulsion is allowed to solidify, thereby the butterlike composition, having butterlike properties, is obtained.

The method steps herein described are preferably executed at ambient temperature, using ingredients equilibrated to ambient temperature.

According to a preferred embodiment of the invention substances, such as, but not limited to, flavor, preservative, colorant, acid, salt and other food additives are added to the composition. Such additives are preferably added only after the emulsion is stabilized, so as to avoid destabilization effects.

It will be appreciated by one ordinarily skilled in the art that following the above method steps the oil added to the composition maintains its chemical make-up in the solidified butterlike product. Thus, the oil's quality, its original molecular structure, its biological characteristics and its nutritional value are preserved throughout the process and in the final product, the novel butterlike composition.

Thus, the present invention provides a butterlike composition which is advantageous for human consumption when compared with prior art butterlike products, such as butter and margarine.

First, the use of olive oil has many advantages over the use of other oils or fats. This is supported by studies which confirm that olive oil rich diet, especially of cold press olive oil (extra virgin), decreases blood cholesterol levels, reduces the LDL/HDL ratio and thereby reduces the likelihood of developing cardiovascular diseases associated with high blood cholesterol levels and LDL/HDL ratios.

Second, the present invention provides a butterlike composition which is very low in fat and in Calories content as is compared with accepted butterlike products. As such, the butterlike composition of the present invention is not only healthier, but it is desirous according to the wide spread "thin is beautiful" trend of the Western world.

Third, the present invention provides a butterlike composition which is, as compared with known solid fat based foods, exceptionally low in saturated fat, yet it still maintains its butterlike properties.

Fourth, the present invention provides a butterlike composition with very high content of nutritional fibers, which are known to have beneficiary effects on human health, including in reducing blood cholesterol levels, assisting in digestive processes, and reducing the likelihood of developing intestine and colon cancers.

Fifth, the present invention provides a butterlike composition devoid of harmful fat trans acids, which are present in hydrogenated butterlike compositions such as margarine.

Thus, according to the present invention there is provided a butterlike composition which is low in total fat content, Calories and saturated fat as compared with prior art products and which includes unmodified fat derived from vegetable oils and nutritional fibers both are beneficiary to human health.

EXAMPLES

Reference is now made to the following examples, which together with the above descriptions, illustrate the invention in a non limiting fashion.

Example 1

Olive oil, either extra virgin or purified (250 grams) was mixed with lecithin (7 grams) in a mixer (Stephan, Germany) revolving at 1,400 rpm for 2.5 minutes. Thereafter, the revolution speed was raised to 3,000 rpm and water (preboiled, 600 ml) was gradually added, ensuring the formation of emulsion. While still at high speed, 3 grams of xanthan gum and 5 grams of pectin were added to the resulted emulsion. Then, citric acid (1 gram), glucono delta lactone (GDL, 1 gram), potassium sorbat (1 gram), NaCl (20 gram), beta-carotene (0.2 gram) and natural antioxidant were added and the mixture was mixed for one additional minute at the high speed. Thereafter 500 grams of FUBRULINE were added and the mixture was mixed for additional five minutes at the high speed. Upon adding the FUBRULINE the emulsion thickened, then, after the FUBRULINE dissolved in the water fraction, it reliquified. At this stage the mixture was poured into molds and was left to solidify for several minutes. The resulting solidified composition featured butterlike properties. All steps were performed at ambient temperature (which was about 20° C.) using ingredients equilibrated to ambient temperature. The resulting product was stored in the refrigerator. Table 1 below summarizes the composition, process parameters, and calculated and measured characteristics of the resulting composition.

The resulting composition had butterlike texture and appearance and it behaved like butter and margarine when it was used as a spread, for backing and for frying, giving the resulting foods exquisite and unique flavor of olive oil.

butterlike composition of the present invention. The health benefits inherent to the butterlike composition of the present invention are self evident.

TABLE 1

|  | Extra virgin olive oil | Refined olive oil |
|---|---|---|
| COMPOSITION | | |
| WATER | 43.25 w % | 43.25 w % |
| REFINED OLIVE OIL | 0.00 w % | 18.02 w % |
| EXTRA VIRGIN OLIVE OIL | 18.02 w % | 0.00 w % |
| FUBRULINE INSTANT | 36.04 w % | 36.04 w % |
| XANTHAN GUM | 0.22 w % | 0.22 w % |
| LECITHIN | 0.43 w % | 0.43 w % |
| PECTIN 450RF | 0.36 w % | 0.36 w % |
| GDL | 0.07 w % | 0.07 w % |
| CITRIC ACID | 0.07 w % | 0.07 w % |
| POTASSIUM SORBAT | 0.07 w % | 0.07 w % |
| SALT | 1.44 w % | 1.44 w % |
| BETA-CAROTENE | 0.01 w % | 0.01 w % |
| PROCESS PARAMETERS | | |
| WATER TEMPERATURE ° C. | 20 | 20 |
| ADDITION DRY MATTER AT ° C. | 20 | 20 |
| FILLING TEMPERATURE ° C. | 20 | 20 |
| STORAGE TEMPERATURE ° C. | 2–8 | 2–8 |
| CALCULATED CHARACTERISTICS | | |
| FAT CONTENT | 18.00 w % | 18.00 w % |
| DRY MATTER | 22.61 w % | 22.61 w % |
| CARBOHYDRATE CONTENT | 2.33 w % | 2.33 w % |
| FIBER CONTENT | 19.95 w % | 19.95 w % |
| MEASURED CHARACTERISTICS AT 25° C. | | |
| PENETRATION FORCE (G) | 140–150 | 140–150 |
| PH** | 3.3–3.6 | 3.3–3.6 |
| HARDNESS*** | SOFT SOLID | SOFT SOLID |
| APPEARANCE | STABLE | STABLE |
| COLOR | YELLOWISH-WHITISH | YELLOWISH-WHITISH |

*Penetration force was determined using a penetrometer.
**pH was determined using a pH meter in the liquid state.
***Hardness was compared to commercial margarine under the same temperature.

Tables 2–3 below compare between various parameters of butter, margarine, light margarine and mayonnaise and the

TABLE 2

| | Product: | | | | |
|---|---|---|---|---|---|
| Parameter: | Butter | Margarine | Light Margarine | Mayonnaise | Butterlike composition |
| Energy content (Cal. per 100 grams) | 717 | 742 | 345 | 659 | 210 |
| Source of fat | Milk fat | Soy/corn oil | Soy/corn oil | Soy oil | Olive oil |
| Fat (w %) | 81 | 82 | 39 | 71 | 22 |
| Saturated fat (w %) | 50 | 15 | 7 | 10 | 2.1 |
| Treatment of fat | Purification | Hydrogenation | Hydrogenation | Purification | — |
| Molecular structure | Mostly saturated, 50 w % | Fat trans acid present | Fat trans acid present | Mostly not saturated | Mostly not saturated |
| Polyunsaturated fatty acids (w %) | 23 | 39 | 15 | 15 | 14 |
| Polysaturated fatty acids (w %) | 3 | 25 | 13 | 41 | 1.6 |
| Presence of natural anti oxidants | Small | Small | Small | Small | Large |
| Nutritional fibers (w %) | 0 | 0 | 0 | 0 | 28 |
| Cholesterol (mg per 100 grams) | 219 | 0 | 0 | 36 | 0 |

TABLE 2-continued

| | Product: | | | | |
|---|---|---|---|---|---|
| Parameter: | Butter | Margarine | Light Margarine | Mayonnaise | Butterlike composition |
| Uses | Baking, spreads frying | Baking, spreads frying | Baking, spreads frying | Spreads, sauces | Baking, spreads frying |
| Carbohydrates (w %) | 0.06 | 0 | 0.4 | 3 | 3 |
| Kosher | Dairy | Parve | Parve | Parve | Parve |

TABLE 3

| Product: | Energy (Cal. per 100 grams) | Total fat (w %) | Saturated fat (w %) | Cholesterol (mg per 100 grams) | Nutritional fibers (w %) | Fat source |
|---|---|---|---|---|---|---|
| Margarine | 742 | 82 | 15.00 | 0 | 0 | Soy/corn oil |
| Butter | 717 | 81 | 50.00 | 219 | 0 | Milk fat |
| Mayonnaise | 659 | 71 | 10.00 | 36 | 0 | Soy oil |
| Butterlike composition | 210 | 22 | 2.1 | 0 | 28 | Olive oil |

Example 2

Extra virgin olive oil was mixed in individual experiments with the ingredients and under the process parameters listed in Tables 4–17. The calculated and measured characteristics of the resulting compositions are provided as well.

The resulting compositions were inferior in their butter-like properties as compared with those of the compositions of Example 1 above, however, some of these compositions can be used as mayonnaise like soft spreads, gel type spreads, etc.

TABLE 4

| Composition | |
|---|---|
| Water (w %) | 42.80 |
| Extra virgin olive oil (w %) | 20.00 |
| FUBRULINE INSTANT (w %) | 35.00 |
| Xantham gum (w %) | 0.10 |
| Flavor (w %) | 1.90 |
| Citric acid (w %) | 0.04 |
| Potassium sorbat (w %) | 0.20 |
| Process parameters | |
| Water temperature ° C. | 80 |
| Addition dry matter at ° C. | 80 |
| Pasteurization temperature ° C. | 80 |
| Pasteurization time (min) | 5 |
| Filling temperature ° C. | 80 |
| Storage temperature ° C. | 20 |
| Calculated characteristics | |
| Fat content (w %) | 20.00 |
| Dry matter (w %) | 36.57 |
| Carbohydrate content (w %) | 4.01 |
| Fiber content (w %) | 31.50 |
| Measured characteristics at 25° C. | |
| Penetration force (G) | 130 |
| PH | 2.9 |
| Hardness | Soft |
| Appearance | Stable |
| Color | Yellow |
| Spreadability | Smooth |

TABLE 5

| Composition | |
|---|---|
| water (w %) | 61.30 |
| Extra virgin olive oil (w %) | 20.00 |
| FIBRULINE LC (w %) | 16.50 |
| Xantham gum (w %) | 0.10 |
| Flavor (w %) | 1.90 |
| Citric acid (w %) | 0.04 |
| Potassium sorbat (w %) | 0.20 |
| Process parameters | |
| Water temperature ° C. | 80 |
| Addition dry matter at ° C. | 80 |
| Pasteurization temperature ° C. | 80 |
| Pasteurization time (min) | 5 |
| Filling temperature ° C. | 80 |
| Storage temperature ° C. | 20 |
| Calculated characteristics | |
| Fat content (w %) | 20.00 |
| Dry matter (w %) | 18.22 |
| Carbohydrate content (w %) | 2.24 |
| Fiber content (w %) | 15.68 |
| Measured characteristics at 25° C. | |
| Penetration force (G) | 100 |
| PH | 2.9 |
| Hardness | Soft |
| Appearance | EW of drops |
| Color | Yellow |
| Spreadability | Smooth |

TABLE 6

| Composition | |
|---|---|
| Water (w %) | 56.80 |
| Extra virgin olive oil (w %) | 20.00 |
| FIBRULINE LC (w %) | 21.00 |
| Xantham gum (w %) | 0.10 |
| Flavor (w %) | 1.90 |
| Citric acid (w %) | 0.04 |
| Potassium sorbat (w %) | 0.20 |

TABLE 6-continued

Process parameters

| | |
|---|---|
| Water temperature ° C. | 80 |
| Addition dry matter at ° C. | 80 |
| Pasteurization temperature ° C. | 80 |
| Pasteurization time (min) | 5 |
| Filling temperature ° C. | 80 |
| Storage temperature ° C. | 20 |

Calculated characteristics

| | |
|---|---|
| Fat content (w %) | 20.00 |
| Dry matter (w %) | 22.61 |
| Carbohydrate content (w %) | 2.33 |
| Fiber content (w %) | 19.95 |

Measured characteristics at 25° C.

| | |
|---|---|
| Penetration force (G) | 140 |
| PH | 2.9 |
| Hardness | soft |
| Appearance | EW of drops |
| Color | Yellow |
| Spreadability | Smooth |

TABLE 7

Composition

| | |
|---|---|
| Water (w %) | 52.80 |
| Extra virgin olive oil (w %) | 20.00 |
| FIBRULINE LC (W %) | 21.00 |
| Xantham gum (w %) | 0.10 |
| Flavor (w %) | 1.90 |
| Citric acid (w %) | 0.04 |
| Potassium sorbat (w %) | 0.20 |

Process parameters

| | |
|---|---|
| Water temperature ° C. | 80 |
| Addition Dry matter (w %) at ° C. | 80 |
| Pasteurization temperature ° C. | 80 |
| Pasteurization time (min) | 5 |
| Filling temperature ° C. | 80 |
| Storage temperature ° C. | 20 |

Calculated characteristics

| | |
|---|---|
| Fat content (w %) | 20.00 |
| Dry matter (w %) | 26.51 |
| Carbohydrate content (w %) | 2.41 |
| Fiber content (w %) | 23.75 |

Measured characteristics at 25° C.

| | |
|---|---|
| Penetration force (G) | 240–250 |
| PH | 2.9 |
| Hardness | Gelled |
| Appearance | EW of drops |
| Color | Yellow |
| Spreadability | Smooth |

TABLE 8

Composition

| | |
|---|---|
| Water (w %) | 56.80 |
| Extra virgin olive oil (w %) | 20.00 |
| FIBRULINE LC (W %) | 25.00 |
| Xantham gum (w %) | 0.10 |
| Flavor (w %) | 1.90 |
| Citric acid (w %) | 0.04 |
| Potassium sorbat (w %) | 0.20 |

Process parameters

| | |
|---|---|
| Water temperature ° C. | 80 |
| Addition of dry matter at ° C. | 80 |
| Pasteurization temperature ° C. | 80 |
| Pasteurization time (min) | 5 |
| Filling temperature ° C. | 70 |
| Storage temperature ° C. | 8 |

Calculated characteristics

| | |
|---|---|
| Fat content (w %) | 20.00 |
| Dry matter (w %) | 22.61 |
| Carbohydrate content (w %) | 2.33 |
| Fiber content (w %) | 19.95 |

Measured characteristics at 25° C.

| | |
|---|---|
| Penetration force (G) | 120–125 |
| PH | 2.9 |
| Hardness | Soft gel |
| Appearance | Stable |
| Color | White |
| Spreadability | Very smooth |

TABLE 9

Composition

| | |
|---|---|
| Water (w %) | 52.80 |
| Extra virgin olive oil (w %) | 20.00 |
| FIBRULINE LC (W %) | 25.00 |
| Xantham gum (w %) | 0.10 |
| Flavor (w %) | 1.90 |
| Potassium sorbat (w %) | 0.20 |

Process parameters

| | |
|---|---|
| Water temperature ° C. | 80 |
| Addition of dry matter ° C. | 75 |
| Pasteurization temperature ° C. | 75 |
| Pasteurization time (min) | 7 |
| Filling temperature ° C. | 70 |
| Storage temperature ° C. | 8 |

Calculated characteristics

| | |
|---|---|
| Fat content (w %) | 20.00 |
| Dry matter (w %) | 26.51 |
| Carbohydrate content (w %) | 2.41 |
| Fiber content (w %) | 23.75 |

Measured characteristics at 25° C.

| | |
|---|---|
| Penetration force (G) | 200–220 |
| PH | 2.9 |
| Hardness | Gelled |
| Appearance | Stable |
| Color | Yellow |
| Spreadability | smooth |

TABLE 10

Composition

| | |
|---|---|
| Water (w %) | 42.80 |
| Extra virgin olive oil (w %) | 20.00 |
| Guar gum (w %) | 00.30 |
| Xantham gum (w %) | 0.10 |
| Flavor (w %) | 1.90 |
| Citric acid (w %) | 0.4 |
| Potassium sorbat (w %) | 0.20 |

Process parameters

| | |
|---|---|
| Water temperature ° C. | 80 |
| Addition of dry matter at ° C. | 75 |
| Pasteurization temperature ° C. | 75 |
| Pasteurization time (min) | 7 |
| Filling temperature ° C. | 70 |
| Storage temperature ° C. | 8 |

Calculated characteristics

| | |
|---|---|
| Fat content (w %) | 20.00 |
| Dry matter (w %) | 1.00 |

TABLE 10-continued

Measured characteristics at 25° C.

| | |
|---|---|
| Penetration force (G) | 120 |
| PH | 2.9 |
| Hardness | Gelled |
| Appearance | Stable |
| Color | white |
| Spreadability | smooth |

TABLE 11

Composition

| | |
|---|---|
| Water (w %) | 42.80 |
| Extra virgin olive oil (w %) | 20.00 |
| Gum arabic (w %) | 00.40 |
| Xantham gum (w %) | 0.10 |
| Flavor (w %) | 1.90 |
| Citric acid (w %) | 0.4 |
| Potassium sorbat (w %) | 0.20 |

Process parameters

| | |
|---|---|
| Water temperature ° C. | 80 |
| Addition of dry matter at ° C. | 75 |
| Pasteurization temperature ° C. | 75 |
| Pasteurization time (min) | 7 |
| Filling temperature ° C. | 70 |
| Storage temperature ° C. | 8 |

Calculated characteristics

| | |
|---|---|
| Fat content (w %) | 20.00 |
| Dry matter (w %) | 1.00 |

Measured characteristics at 25° C.

| | |
|---|---|
| Penetration force (G) | 110 |
| PH | 2.9 |
| Hardness | Gelled |
| Appearance | Stable |
| Color | White |
| Spreadability | smooth |

TABLE 12

Composition

| | |
|---|---|
| Water (w %) | 42.80 |
| Extra virgin olive oil (w %) | 20.00 |
| Gum arabic (w %) | 00.40 |
| Xantham gum (w %) | 0.10 |
| Starch (w %) | 2.00 |
| Flavor (w %) | 1.90 |
| Citric acid (w %) | 0.4 |
| Potassium sorbat (w %) | 0.20 |

Process parameters

| | |
|---|---|
| Water temperature ° C. | 80 |
| Addition of dry matter at ° C. | 75 |
| Pasteurization temperature ° C. | 80 |
| Pasteurization time (min) | 5 |
| Filling temperature ° C. | 80 |
| Storage temperature ° C. | 20 |

Calculated characteristics

| | |
|---|---|
| Fat content (w %) | 20.00 |
| Dry matter (w %) | 2.50 |
| Carbohydrate content (w %) | 2.00 |

Measured characteristics at 25° C.

| | |
|---|---|
| Penetration force (G) | 120 |
| PH | 3.4 |
| Hardness | Soft |

TABLE 12-continued

| | |
|---|---|
| Appearance | Stable |
| Color | White |
| Spreadability | Coarse |

TABLE 13

Composition

| | |
|---|---|
| Water (w %) | 42.80 |
| Extra virgin olive oil (w %) | 20.00 |
| Gum arabic (w %) | 00.40 |
| Xantham gum (w %) | 0.10 |
| Gelatin (w %) | 1.50 |
| Flavor (w %) | 1.90 |
| Citric acid (w %) | 0.4 |
| Potassium sorbat (w %) | 0.20 |

Process parameters

| | |
|---|---|
| Water temperature ° C. | 80 |
| Addition of dry matter at ° C. | 75 |
| Pasteurization temperature ° C. | 80 |
| Pasteurization time (min) | 5 |
| Filling temperature ° C. | 80 |
| Storage temperature ° C. | 20 |

Calculated characteristics

| | |
|---|---|
| Fat content (w %) | 20.00 |
| Dry matter (w %) | 2.50 |

Measured characteristics at 25° C.

| | |
|---|---|
| Penetration force (G) | 160 |
| PH | 3 |
| Hardness | gelled |
| Appearance | Stable |
| Color | White |
| Spreadability | smooth |

TABLE 14

Composition

| | |
|---|---|
| Water (w %) | 42.80 |
| Extra virgin olive oil (w %) | 20.00 |
| Gum arabic (w %) | 00.40 |
| Xantham gum (w %) | 0.10 |
| Carrageenan (w %) | 2.00 |
| Flavor (w %) | 1.90 |
| Citric acid (w %) | 0.4 |
| Potassium sorbat (w %) | 0.20 |

Process parameters

| | |
|---|---|
| Water temperature ° C. | 80 |
| Addition of dry matter at ° C. | 75 |
| Pasteurization temperature ° C. | 80 |
| Pasteurization time (min) | 5 |
| Filling temperature ° C. | 80 |
| Storage temperature ° C. | 20 |

Calculated characteristics

| | |
|---|---|
| Fat content (w %) | 20.00 |
| Dry matter (w %) | 2.50 |

Measured characteristics at 25° C.

| | |
|---|---|
| Penetration force (G) | 140 |
| PH | 3.2 |
| Hardness | gelled |
| Appearance | Stable |
| Color | White |
| Spreadability | smooth |

TABLE 15

| Composition | |
|---|---|
| Water (w %) | 42.80 |
| Extra virgin olive oil (w %) | 20.00 |
| Gum arabic (w %) | 00.40 |
| Xantham gum (w %) | 0.10 |
| Alginate (w %) | 2.00 |
| Flavor (w %) | 1.90 |
| Citric acid (w %) | 0.4 |
| Potassium sorbat (w %) | 0.20 |
| Process parameters | |
| Water temperature ° C. | 80 |
| Addition of dry matter at ° C. | 75 |
| Pasteurization temperature ° C. | 80 |
| Pasteurization time (min) | 5 |
| Filling temperature ° C. | 80 |
| Storage temperature ° C. | 20 |
| Calculated characteristics | |
| Fat content (w %) | 20.00 |
| Dry matter (w %) | 2.50 |
| Measured characteristics at 25° C. | |
| Penetration force (G) | 170 |
| PH | 3 |
| Hardness | Gelled |
| Appearance | Stable |
| Color | White |
| Spreadability | Smooth |

TABLE 16

| Composition | |
|---|---|
| Water (w %) | 42.80 |
| Extra virgin olive oil (w %) | 20.00 |
| Gum arabic (w %) | 00.40 |
| Xantham gum (w %) | 0.10 |
| LBG (w %) | 2.50 |
| Flavor (w %) | 1.90 |
| Citric acid (w %) | 0.4 |
| Potassium sorbat (w %) | 0.20 |
| Process parameters | |
| Water temperature ° C. | 80 |
| Addition of dry matter at ° C. | 75 |
| Pasteurization temperature ° C. | 80 |
| Pasteurization time (min) | 5 |
| Filling temperature ° C. | 80 |
| Storage temperature ° C. | 20 |
| Calculated characteristics | |
| Fat content (w %) | 20.00 |
| Dry matter (w %) | 3.00 |
| Measured characteristics at 25° C. | |
| Penetration force (G) | 180 |
| PH | 3.2 |
| Hardness | Gelled |
| Appearance | Stable |
| Color | White |
| Spreadability | Smooth |

TABLE 17

| Composition | |
|---|---|
| Water (w %) | 42.80 |
| Extra virgin olive oil (w %) | 20.00 |
| Gum arabic (w %) | 00.40 |
| Xantham gum (w %) | 1.80 |
| Flavor (w %) | 1.90 |
| Citric acid (w %) | 0.4 |
| Potassium sorbat (w %) | 0.20 |
| Process parameters | |
| Water temperature ° C. | 80 |
| Addition of dry matter at ° C. | 75 |
| Pasteurization temperature ° C. | 80 |
| Pasteurization time (min) | 5 |
| Filling temperature ° C. | 80 |
| Storage temperature ° C. | 20 |
| Calculated characteristics | |
| Fat content (w %) | 20.00 |
| Dry matter (w %) | 2.50 |
| Measured characteristics at 25° C. | |
| Penetration force (G) | 160 |
| PH | 3.2 |
| Hardness | Gelled |
| Appearance | Stable |
| Color | White |
| Spreadability | Smooth |

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A method of preparing a butterlike composition comprising the steps of:
   (a) mixing at least one vegetable oil with at least one emulsifier to obtain an oil-emulsifier mixture;
   (b) while mixing said oil-emulsifier mixture, adding water to said oil-emulsifier mixture at a rate permitting formation of an emulsion;
   (c) while mixing said emulsion, adding an emulsion stabilizer to said emulsion for obtaining a stabilized emulsion;
   (d) while mixing said stabilized emulsion, adding to said stabilized emulsion inulin for obtaining an inulin-containing emulsion; and
   (e) pouring said inulin-containing emulsion into molds and allowing said inulin-containing emulsion to solidify, thereby obtaining the butterlike composition.

2. The method of claim 1, wherein steps (a) through (e) are executed at ambient temperature.

3. The method of claim 1, further comprising the step of adding to said emulsion at least one substance selected from the group consisting of flavor, preservative, colorant, acid and salt.

4. The method of claim 3, wherein said flavor is independently selected from the group consisting of butter flavor, butter vanilla flavor and olive flavor, said preservative is independently selected from the group consisting of potassium sorbate, sodium benzoate, lactic acid and citric acid, said colorant is independently selected from the group consisting of carotenoid, riboflavin, corcumin, beet powder, red color MN and spinach oleoresin, said acid is independently selected from the group consisting of citric acid and glucono delta lactone, whereas said salt is independently selected from the group consisting of sodium chloride and potassium chloride.

5. The method of claim 1, wherein said at least one vegetable oil maintains its chemical make-up throughout steps (a) to (e).

6. The method of claim 1, wherein said at least one vegetable oil is selected from the group consisting of olive oil, cocoa oil, sunflower seed oil, soybean oil, corn oil, sesame oil, peanut oil, coconut oil and palm oil.

7. The method of claim 1, wherein said at least one vegetable oil is olive oil.

8. The method of claim 1, wherein said at least one vegetable oil is a liquid oil at ambient temperature.

9. The method of claim 1, wherein said inulin is selected from the group consisting of instant gelating inulin and long chain inulin.

10. The method of claim 1, wherein said emulsifier is lecithin.

11. The method of claim 1, wherein said stabilizer is selected from the group consisting of natural seaweed extract, natural seed gum, natural plant exudate, natural fruit extract, animal skin and bone extract, bio-synthetic gum, starch and cellulose.

12. The method of claim 1, wherein:
  (a) said natural seaweed extract is independently selected from the group consisting of carrageenan, alginates, agar, agarose, fucellan and xantham gum;
  (b) said natural seed gum is independently selected from the group consisting of guar gum, locust bean gum, tara gum, tamarind gum and psillium gum;
  (c) said natural plant exudate is independently selected from the group consisting of gum arabic, tragacanth, karaya and ghatti;
  (d) said natural fruit extract is independently selected from the group consisting of low and high methoxyl pectins;
  (e) said animal skin and bone extract is independently selected from the group consisting of gelatin A and B and hydrolyzed gelatin;
  (f) said bio-synthetic gum is independently selected from the group consisting of xantham, gellan, curdian and pullulan;
  (g) said starch is independently selected from the group consisting of natural starch and chemically, physically and enzymatically modified starch; whereas
  (h) said cellulose is independently selected from the group consisting of alpha cellulose, CMC, HPC, HPMC, MC, microcrystalline cellulose and inulin.

13. The method of claim 1, wherein said butterlike composition comprises about 5–30 weight percent fat.

14. The method of claim 13 wherein said butterlike composition comprises less than 5 weight percent saturated fat.

15. The method of claim 14 wherein said butterlike composition comprises ingredients providing 50–250 Calories per 100 grams.

16. The method of claim 13 wherein said butterlike composition comprises ingredients providing 50–250 Calories per 100 grams.

17. The method of claim 1, wherein said butterlike composition comprises less than 5 weight percent saturated fat.

18. The method of claim 17 wherein said butterlike composition comprises ingredients providing 50–250 Calories per 100 grams.

19. The method of claim 1, wherein said butterlike composition comprises ingredients providing 50–250 Calories per 100 grams and having butterlike properties.

20. The method of claim 1, wherein the butterlike composition comprises about 15–25 weight percent oil and 20–40 weight percent inulin.

* * * * *